United States Patent
Lee et al.

(10) Patent No.: US 8,149,596 B2
(45) Date of Patent: Apr. 3, 2012

(54) N-PHASE FULL BRIDGE POWER CONVERTER

(75) Inventors: Yi-Ying Lee, Taipei County (TW); Ming-Che Yang, Taichung County (TW); Pao-Chuan Lin, Hsinchu County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 407 days.

(21) Appl. No.: 12/504,035

(22) Filed: Jul. 16, 2009

(65) Prior Publication Data

US 2010/0142240 A1 Jun. 10, 2010

(30) Foreign Application Priority Data

Dec. 5, 2008 (TW) ................................ 97147361 A

(51) Int. Cl.
*H02M 3/335* (2006.01)
*H02M 7/5387* (2006.01)

(52) U.S. Cl. .......................................... 363/17; 363/132

(58) Field of Classification Search .................... 363/16, 363/17, 97, 98, 131, 132
See application file for complete search history.

(56) References Cited

U.S. PATENT DOCUMENTS 6,151,222 A * 11/2000 Barrett ............................. 363/16
7,362,596 B2 * 4/2008 Gjerde et al. .................... 363/69

* cited by examiner

*Primary Examiner* — Matthew Nguyen
(74) *Attorney, Agent, or Firm* — WPAT., P.C.; Justin King

(57) ABSTRACT

An N-phase full bridge power converter, comprising: a load device; a plurality of bridge legs, each being composed of two power switches; a plurality of transformers, each being coupled between two nodes each disposed between two power switches in two adjacent bridge legs on its primary side and coupled to the load device on its secondary side; and a plurality of inductors, each being connected between a node and the primary side of one of the transformers corresponding thereto.

7 Claims, 8 Drawing Sheets

N-PHASE FULL BRIDGE POWER CONVERTER

1. FIELD OF THE INVENTION

The present invention generally relates to an n-phase full bridge power converter and, more particularly, to a high-output power converter. Since the power switches are required to allow higher current to prevent from being damaged in high-power applications and considerations such as power consumption and overall efficiency have to be taken into account, it is problematic to select proper power devices.

2. BACKGROUND OF THE INVENTION

The currently available high-power conversion is implemented by using shunt power switches. In the conventional high power full bridge converter in FIG. 1, the first bridge leg is composed of power switches Q1, Q2, Q3 and Q4, the second bridge leg is composed of power switches Q5, Q6, Q7 and Q8. Such a circuit configuration is similar to the conventional full bridge converter that the parallel bridge legs need no additional control, resulting in a reduced conduction current for each power switches. However, as the output power increases, the number of parallel power switches increases as well. Moreover, since the power switches may not be identical in every parameter and synchronous driving for the gates of the parallel power switches is hard to implement, the current from each parallel power switches may not be identical.

Moreover, in order to reduce the switching loss and the switching stress of the power devices, phase-shift modulation is generally used. FIG. 2 shows the waveforms of the conduction current of the power switches in FIG. 1. It is found that, due to the parallel configuration, the effective conduction current for the power switches in each bridge leg is similar.

Moreover, two full bridge phase-shift modules can be used as shown in FIG. 3. The phase delay between the two full bridge phase-shift modules helps to improve the current ripples and overcome the problems due to difficulty in heat dissipations in the single phase-shift module configuration. Also, like the converter in FIG. 2, the increased number of bridge legs leads to higher cost. Similarly, the converter having three full bridge modules is as shown in FIG. 4, resulting in problems as the converter in FIG. 3.

SUMMARY OF THE INVENTION

It is one object of the present invention to provide an n-phase full bridge power converter for high-power load devices. The converter is controlled by n-phase pulse-width modulation (PWM) to achieve lowered conduction current for the power switches for high-power output.

To achieve the foregoing object, the present invention provides an n-phase full bridge power converter, comprising:

a load device;

a plurality of bridge legs, each being composed of two power switches;

a plurality of transformers, each being coupled between two nodes each disposed between two power switches in two adjacent bridge legs on its primary side and coupled to the load device on its secondary side; and a plurality of inductors, each being connected between a node and the primary side of one of the transformers corresponding thereto.

BRIEF DESCRIPTION OF THE DRAWINGS

The objects and spirits of various embodiments of the present invention will be readily understood by the accompanying drawings and detailed descriptions, wherein.

DETAILED DESCRIPTION OF THE PREFERRED EMBODIMENT

The present invention can be exemplified but not limited by the embodiments as described hereinafter.

Figure 1:
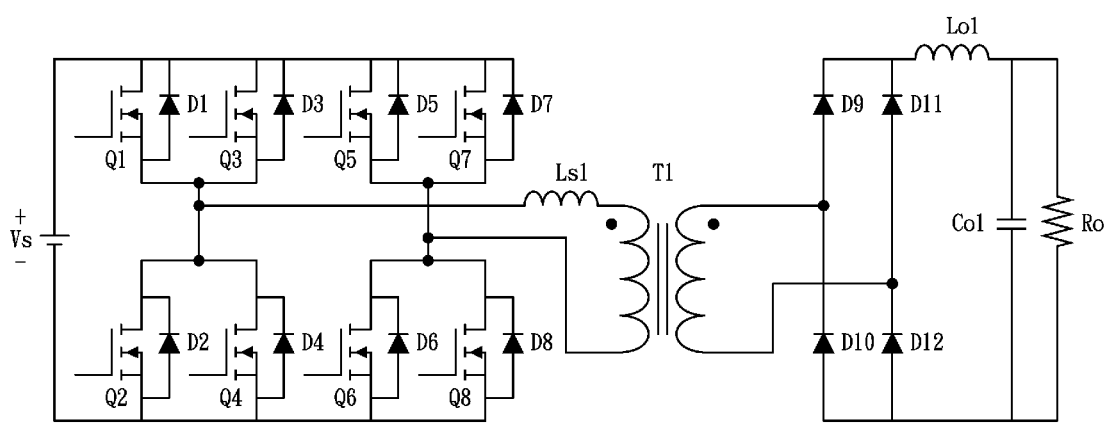
FIG. 1 is a circuit diagram of a conventional full bridge parallel power converter.
Figure 2:
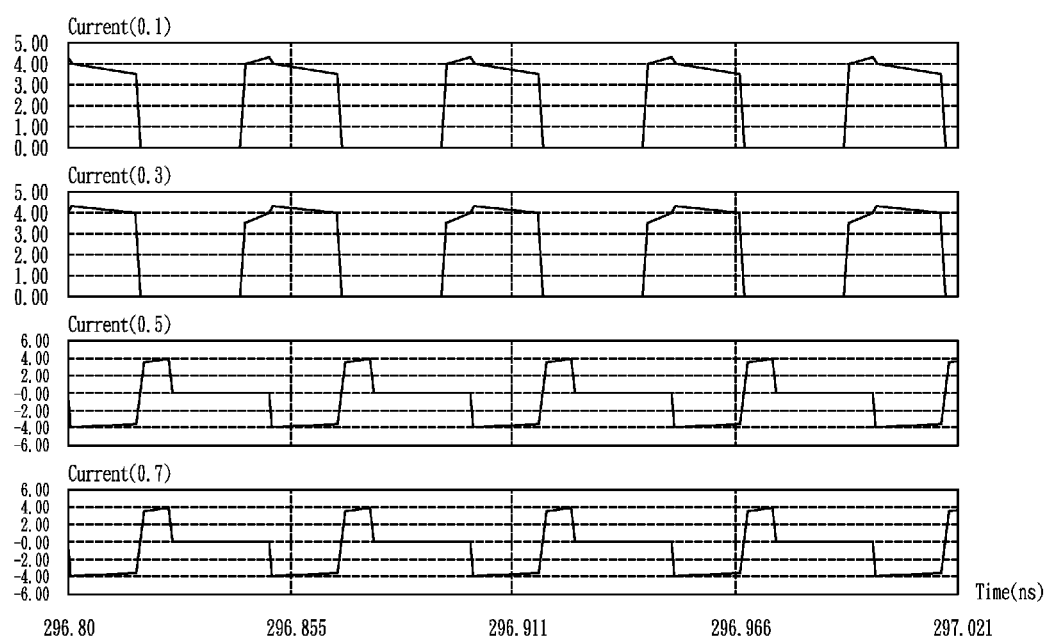
FIG. 2 shows the waveforms of the conduction current of the power switches in FIG. 1.
Figure 3:
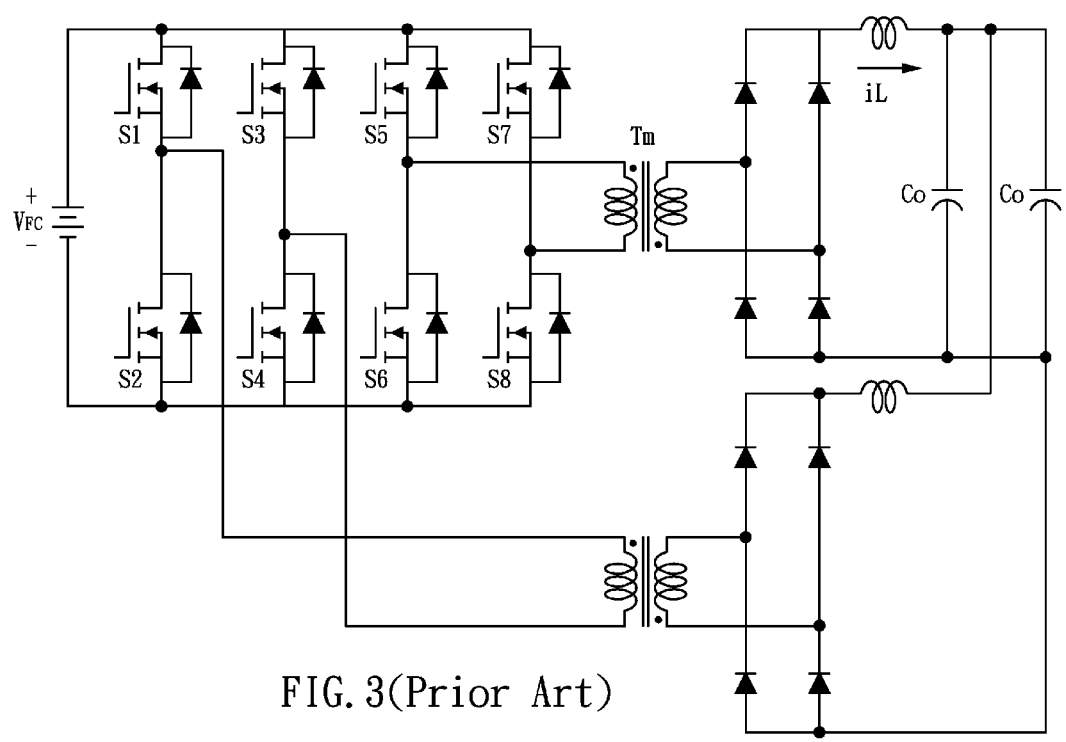
FIG. 3 is a circuit diagram of a conventional power converter with two full bridge parallel modules.
Figure 4:
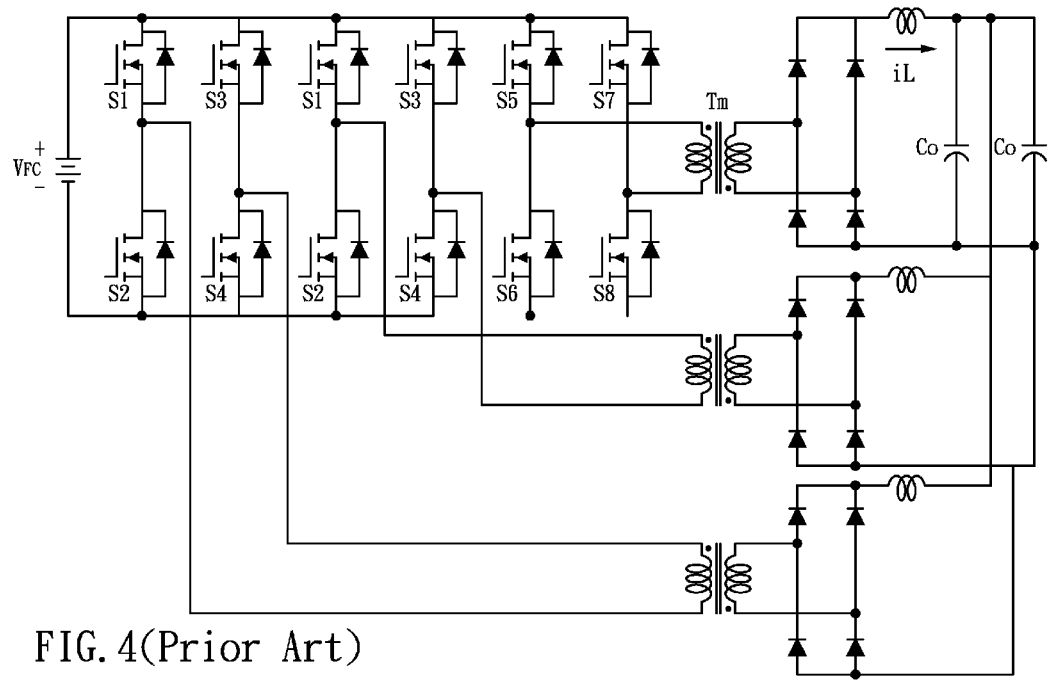
FIG. 4 is a circuit diagram of a conventional power converter with three full bridge parallel modules.
Figure 5:
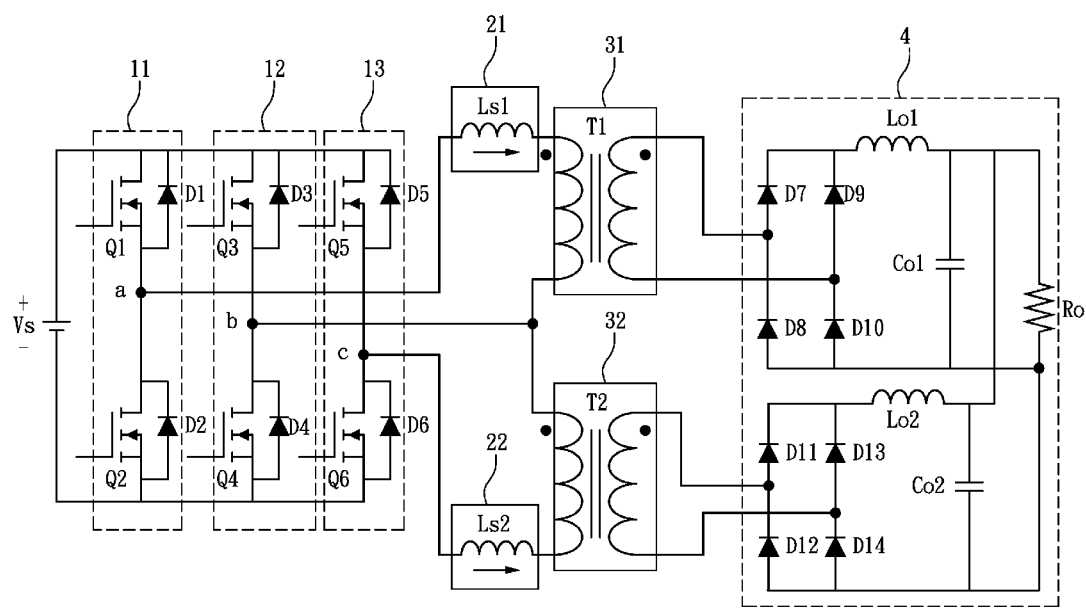
FIG. 5 is a circuit diagram of a tri-phase full bridge converter according to the present invention.

Please refer to FIG. 5, which is a circuit diagram of a tri-phase full bridge converter according to the present invention. The n-phase full bridge power converter comprises a load device 4, a plurality of transformers 31 to 32, a plurality of inductors 21 to 22, and a plurality of bridge legs, namely the first bridge leg 11, the second bridge leg 12 and the third bridge leg 13, each bridge leg comprising two power switches. The first bridge leg 11 comprises a first power switch Q1 and a second power switch Q2. The second bridge leg 12 comprises a first power switch Q3 and a second power switch Q4. The third bridge leg 13 comprises a first power switch Q5 and a second power switch Q6. Each power switch further comprises a diode, for example an internal stray diode or internal diode in the power switch. The power switches can be metal-oxide-semiconductor field-effect transistors (MOSFET's), bipolar-junction transistors (BJT's) or insulated gate bipolar transistors (IGBT's). The transformers, in the present embodiment, are the first transformer 31 and the second transformer 32, wherein each primary side is coupled between two nodes each disposed between two power switches in two adjacent bridge legs. More particularly, the primary side of the first transformer 31 is coupled between the first bridge leg 11 and the second bridge leg 12. The primary side of the second transformer 32 is coupled to the second bridge leg 12 and the third bridge leg 13. The secondary side of each transformer 31, 32 is connected to the load device 4. The inductors, in the present embodiment, are the first inductor 21 and the second inductor 22. The first and second inductors (21, 22) are disposed respectively on the primary side of the first and second transformers (31, 32). The inductance of the inductor can be the leakage inductance of the transformer. The load device 4 comprises diodes D7 to D14, inductors Lo1 and Lo2, capacitors Co1 and Co2, and resistor Ro. The load device 4 is well-known and readily understood by anyone with ordinary skill in the art, and thus description thereof is not presented.

Figure 6A:
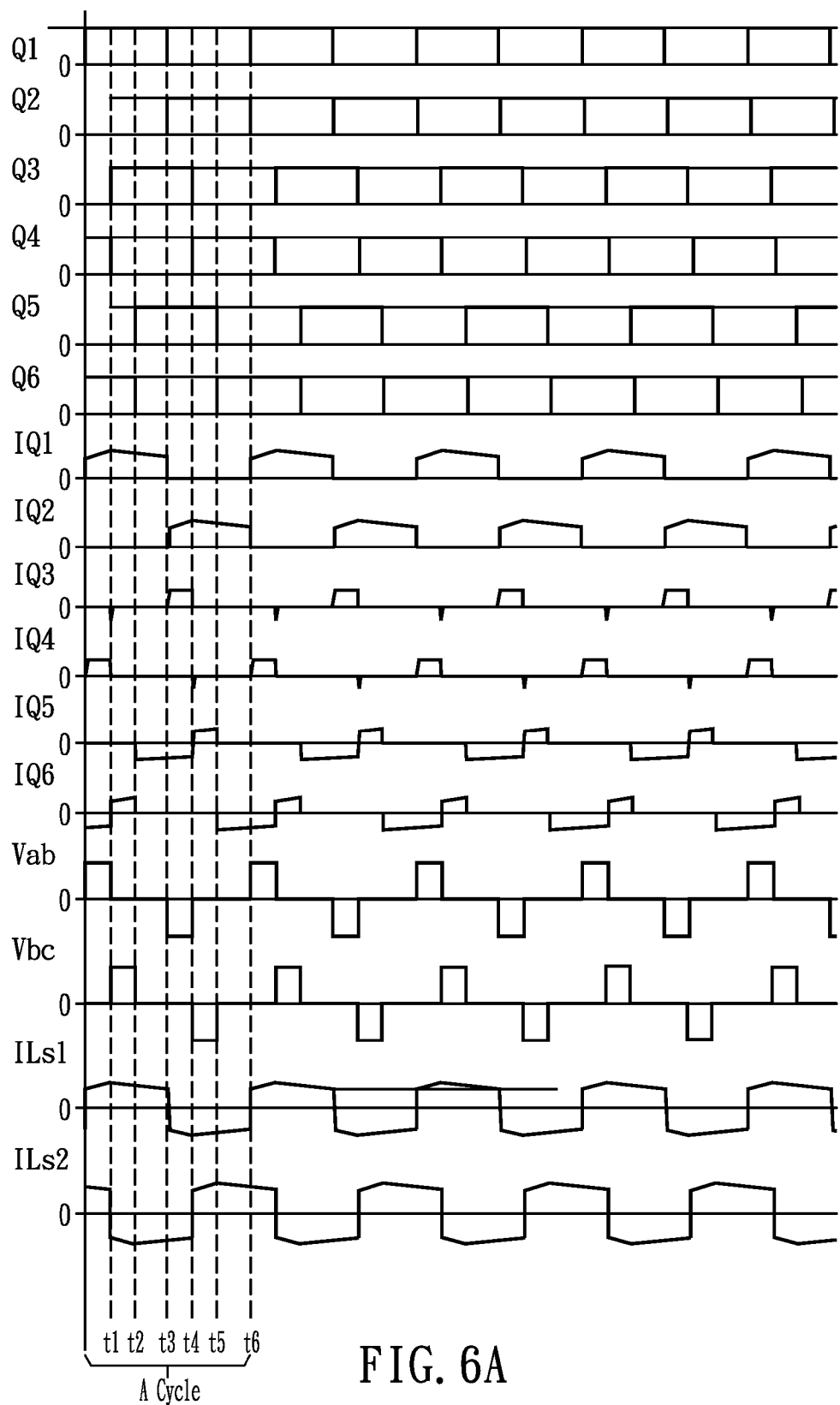
FIG. 6A is a first switching waveform diagram of power switches in FIG. 5.
Figure 6B:
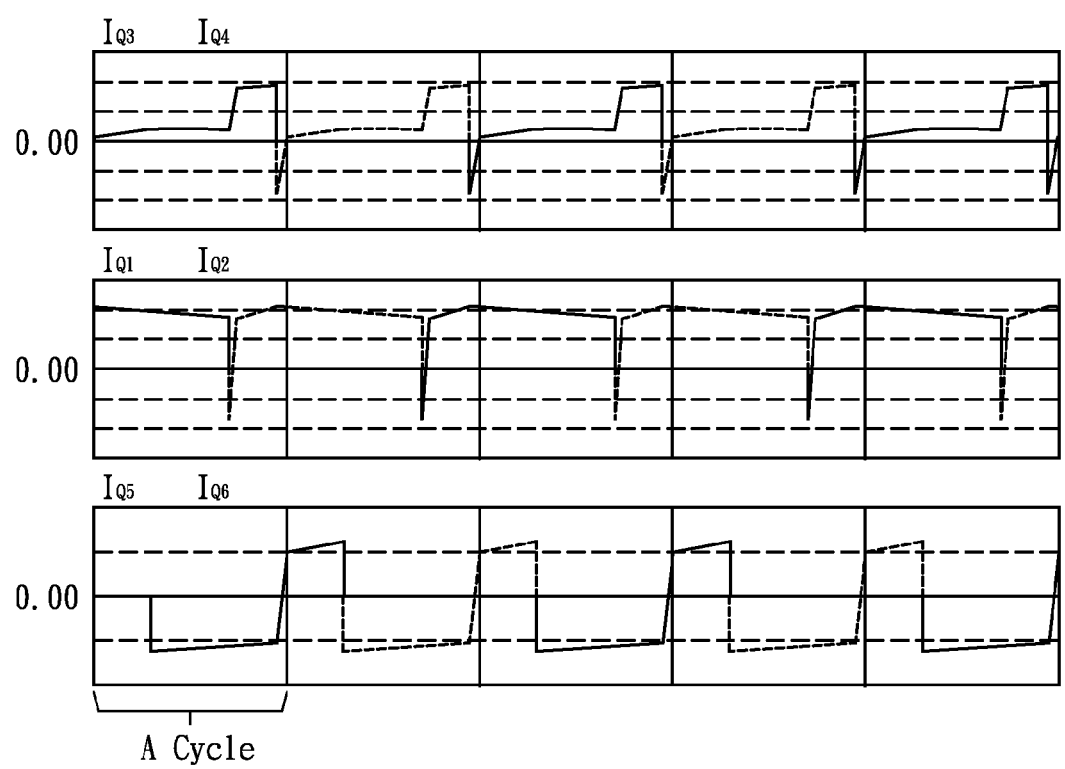
FIG. 6B is a second switching waveform diagram of power switches in FIG. 5.

FIG. 6A and FIG. 6B are switching waveform diagrams of power switches in FIG. 5. Q1 to Q6 denote the gate driving signals of the power switches. $I_{Q1}$ to $I_{Q6}$ denote the conduction currents of the power switches. $V_{ab}$ is the voltage difference between the node a in the bridge leg 11 and the node b in the bridge leg 12. $V_{bc}$ is the voltage difference between the node b in the bridge leg 12 and the node c in the bridge leg 13. $I_{Ls1}$ and $I_{Ls2}$ are the input currents on the primary sides of the transformers. The power switches in each bridge leg are turned on complementarily with a cycle of 180°. There is a phase difference between the two bridge legs. With the phase of a central bridge leg as a reference phase, each of the left-side and right-side bridge legs has a phase lead/lag difference θ, which can be adjusted by n-phase pulse-width modulation (PWM). The primary side of each transformer is coupled between the left-side/right-side bridge leg and the central bridge leg. Since there is a phase difference between the left-side/right-side bridge leg (Q1, Q2)/(Q5, Q6) and the central bridge leg (Q3, Q4), the conduction current in the central bridge leg is zero at the phase of (180−θ)°, i.e., t1-t3 and t4-t6, because the input currents of the two transformers are balanced. At 0-t1 and t3-t4, the conduction current in the central bridge leg is less than two times the conduction current in the left-side/right-side bridge leg because the conduction current in the central bridge leg equals the sum of the input currents of the two transformers.

Figure 7:
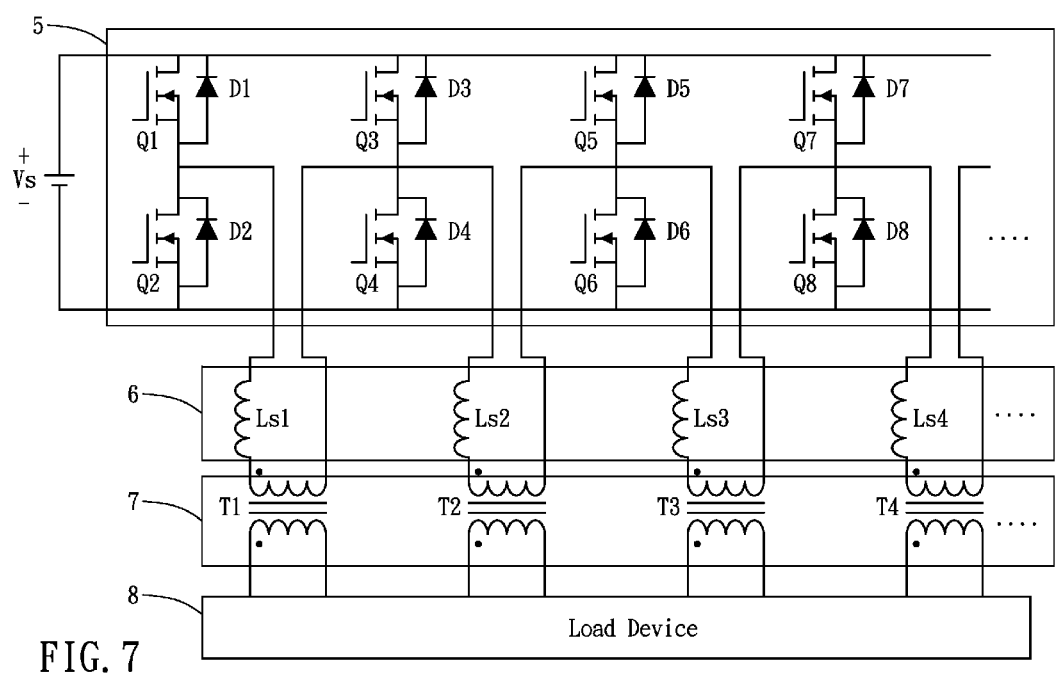
FIG. 7 is a circuit diagram of an n-phase full bridge converter according to the present invention.

As stated above, in the tri-phase full bridge converter, the conduction current of the central bridge leg is almost zero at the phase (180−θ)°. Therefore, the converter can be implemented as an N-phase full bridge converter as shown in FIG. 7. In FIG. 7, there is a phase difference θ between two adjacent bridge legs coupled to the same primary side of one transformer. Similarly, the conduction current of other bridge legs except the left-side/right-side bridge leg approaches zero at the phase (180−θ)°. Therefore, the conduction current is reduced even though the number of power switches decreases.

From FIG. 5 to FIG. 7, the present invention provides an n-phase full bridge power converter for high-power load devices. The converter is controlled by n-phase pulse-width modulation (PWM) to achieve lowered conduction current for the power switches for high-power output. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An N-phase full bridge power converter, comprising:
    a load device;
    a plurality of bridge legs, each being composed of two power switches;
    a plurality of transformers, each being coupled between two nodes each disposed between two power switches in two adjacent bridge legs on its primary side and coupled to the load device on its secondary side; and
    a plurality of inductors, each being connected between a node and the primary side of one of the transformers corresponding thereto;
    wherein the phase difference between gate driving signals of the two power switches in one bridge leg is 180°.

2. The N-phase full bridge power converter as recited in claim 1, wherein the power switches are metal-oxide-semiconductor field-effect transistors (MOSFET's), bipolar-junction transistors (BJT's) or insulated gate bipolar transistors (IGBT's).

3. The n-phase full bridge power converter as recited in claim 1, wherein the inductance of each of the inductors equals the leakage inductance of the transformer corresponding thereto.

4. The N-phase full bridge power converter as recited in claim 1, wherein the phase difference between gate driving signals in the two adjacent bridge legs is an adjustable phase difference θ.

5. The N-phase full bridge power converter as recited in claim 4, wherein the phase difference θ is adjusted by n-phase pulse-width modulation (PWM).

6. The N-phase full bridge power converter as recited in claim 1, wherein the gate driving signal of a left-side bridge leg with respect to a bridge leg has a phase lag θ, while the gate driving signal of a right-side bridge leg with respect to the bridge leg has a phase lead θ.

7. The N-phase full bridge power converter as recited in claim 1, wherein the gate driving signal of a left-side bridge leg with respect to a bridge leg has a phase lead θ, while the gate driving signal of a right-side bridge leg with respect to the bridge leg has a phase lag θ.

* * * * *